United States Patent
Crockett et al.

[11] Patent Number: 6,044,355
[45] Date of Patent: Mar. 28, 2000

[54] SKILLS-BASED SCHEDULING FOR TELEPHONE CALL CENTERS

[75] Inventors: Gary B. Crockett, Plano; Paul H. Leamon, McKinney, both of Tex.

[73] Assignee: IEX Corporation, Richardson, Tex.

[21] Appl. No.: 08/890,228

[22] Filed: Jul. 9, 1997

[51] Int. Cl.[7] .............................. G06F 17/30; H04M 3/50
[52] U.S. Cl. .................................. 705/8; 705/9; 705/10; 379/113; 379/34; 379/112
[58] Field of Search .............................. 705/8–10; 379/34, 379/92.04, 113, 134, 139, 140, 265–266, 309, 112, 92.03

[56] References Cited

U.S. PATENT DOCUMENTS

| | | | |
|---|---|---|---|
| 4,510,351 | 4/1985 | Costello et al. ............................ | 705/8 |
| 5,185,780 | 2/1993 | Leggett ..................................... | 379/34 |
| 5,289,368 | 2/1994 | Jordan et al. .............................. | 705/8 |
| 5,325,292 | 6/1994 | Crockett .................................... | 705/9 |

OTHER PUBLICATIONS

*ACDs Get Skills–Based Routing* —Klenke, Business Communications Review, Jul. 1995 pp. 48–51.

*Primary Examiner*—James P. Trammell
*Assistant Examiner*—Cuong H. Nguyen
*Attorney, Agent, or Firm*—David H. Judson

[57] ABSTRACT

A method for scheduling personnel (e.g., agents) in a work environment based on personnel "skill" levels. The method facilitates true skills-based scheduling of agents in a telephone call center using a simulation tool to predict what fraction of scheduled agents from each "skill group" will be available to each "call type" during each time interval being scheduled. A feedback mechanism is used to adjust net staffing and skills usage data between iterations of a call handling simulation until a given schedule being tested through the simulator meets some acceptance criteria.

20 Claims, 6 Drawing Sheets

SKILLS-BASED SCHEDULING FOR TELEPHONE CALL CENTERS

BACKGROUND OF THE INVENTION

1. Technical Field

The present invention relates generally to software tools used to model the behavior of complex physical systems and more particularly to a method for generating agent schedules for a telephone call center operation based on the "skill" profiles of the agent population.

2. Description of the Related Art

A "call center" is an organization of people, telecommunications equipment and management software, with a mission of efficiently handling telephone-based customer contact. A typical call center must balance competing goals. Customers should experience high quality and consistent service as measured, for example, by how long the customer's call must wait in queue before being answered. At the same time, this service should be provided to make efficient use of call center resources.

"Workforce management" systems provide important tools for meeting the goals of the call center. These systems generate forecasts of call volumes and call handling times based on historical data to determine how much staff will be needed at different times of the day and week. The systems then create schedules that match the staffing to anticipated needs.

Calls that arrive at a call center generally are classified into "call types" based on the dialed number and possibly other information such as calling number or caller responses to prompts from the network. The call center is typically served by an automatic call distributor (ACD), which identifies the call type of each incoming call and either delivers or queues it. Each call type may have a separate first-in-first-out queue in the ACD. In most existing call centers, the agents answering calls are organized into one or more "teams," with each team having primary responsibility of the calls in one or more queues. This paradigm is sometimes referred to as "queue/team."

In the queue/team model, scheduling for each team can be done independently. Suppose, for example, that the call center handles calls for sales, service, and billing, and that each of these call types is served by a separate team. The schedule for sales agents will depend on the forecast for sales call volume and on various constraints and preferences applicable to the agents being scheduled, but this schedule is not affected by the call volume forecast for service or billing. Further, within the sales team, agents can be considered interchangeable from a call handling viewpoint. Thus, within a team, schedule start times, break times and the like, may be traded freely among agents in the team to satisfy agent preferences without affecting scheduled call coverage.

It is known in the prior art to provide ACD systems that depart from the queue/team model described above. Calls are still categorized into call types. In place of queues for the call types, however, queues assoicated with "skills" are provided. The ACD's call distribution logic for the call type determines which queue or queues a call will occupy at various times before it is answered. Agents are not organized into teams with exclusive responsibility for specific queues. Instead, each agent has one or more identified "skills" corresponding to the skills-based queues. Thus, both a given call and a given agent may be connected to multiple queues at the same time. Agent skills designations may be further qualified, for example, as "primary" or "secondary" skills, or with some other designation of skill priority or degree of skill attainment. The ACD call distribution logic may take the skill priority levels into account in its call distribution logic.

In a queue/team environment, when a new call arrived, the ACD determined the call type and essentially asked "Are there any agents available in the team that serves this call type?" If the answer were yes, the team member who had been available the longest would be selected to handle the new call. If the answer were no, the call would be queued, waiting for a team member to free up. Similarly, when an agent became available, the agent would get the longest-waiting call on any of the queues served by the agent's team.

In a skills-based routing environment, on the contrary, the "matching" of calls to agents by the ACD becomes more sophisticated and thus complicated. Agents who have more than one skill no longer "belong" to a well-defined team that handles a restricted set of calls. Instead, the skills definitions form "implicit" teams that overlap in complex ways. If, for example, a call center has 10 skills defined, then agents could in principle have any of 1024 possible combinations ($2^{10}$) of those skills. Each skill combination could be eligible to handle a different subset of the incoming calls, and the eligible subset might vary with time of day, number of calls in queue, or other factors used by the ACD in its call routing decisions.

Schedule of agents in a skills-based environment is thus a much more difficult problem than it is in a queue/team environment. In a skills-based environment, call types cannot be considered in isolation. Thus, for example, a heavy volume of Service calls might place higher demands on multi-skilled agents, causing an unforeseen shortage of coverage for Billing calls. Further, agents with different skills cannot be considered interchangeable for call handling. Thus, trading lunch times between a Sales-only agent and a multi-skill agent might lead to over-staffing Sales at noon while under-staffing Service at 1:00 p.m. This would lead to undesirable results. Moreover, with respect to the needs of a particular call type, a multi-skilled agent might provide no help over a given span of time, might be 100% available for calls of that type, or might be available part of the time and handling other call types for another part of time.

All agents having a particular combination of skills may be deemed a "skill group." The central problem of skills-based scheduling is then finding a way to predict what fraction of scheduled agents from each skill group will be available to each call type during each time interval being scheduled. If these fractions are known, then the effect of different agent schedules can be generated. Unfortunately, no satisfactory method has been found to calculate the skill group availability fractions directly. These functions depend on the relative and absolute call volumes in each call type, on the particulars of the skills-based call distribution algorithms in the ACD, and on the skills profiles of the total scheduled agent population. Particularly as ACD skills-based routing algorithms themselves evolve and become more sophisticated, the factors affecting skill group availability are too complex for direct analysis.

Thus, there is a need to provide a mechanism to facilitate the production of high-quality schedules to make it easier to manage call centers that use skills-based routing in their ACDs. The present invention solves this important problem.

SUMMARY OF THE INVENTION

It is thus a primary object of the invention to schedule agents in a telephone call center environment based on skill profiles of the agent population.

It is another principal object of this invention to facilitate "skills-based" as opposed to "queue/team" routing of telephone calls in a telephone call center.

It is still another important object of the present invention to provide a computer-implemented tool to simulate call handling in a telephone call center to thereby schedule agents in a skills-based workforce environment.

Another important object of this invention is to simulate call handling in a telephone call center environment and use incremental scheduling to produce high-quality schedules in a skills-based routing environment.

It is a more specific object of this invention to facilitate skills-based scheduling of agents in a call center using a simulation tool to predict what fraction of scheduled agents from each "skill group" will be available to each "call type" during each time interval being scheduled.

Yet another object of this invention is to provide a skills-based scheduling mechanism that is adaptable to a wide range of specific ACD skills-based routing methods and is compatible with the constraint and preference handling implementations in existing queue/team schedulers.

These and other objects of this invention are provided in a method for skills-based scheduling method and mechanism. Generally, the invention uses a feedback mechanism involving call handling simulation and incremental scheduling to produce high-quality schedules in a skills-based routing environment.

In accordance with a preferred "skills-based scheduling" method, a computerimplemented tool is used to determine an optimum schedule for a plurality of scheduled agents in a telephone call center, each of the plurality of scheduled agents having a combination of defined skills. The plurality of scheduled agents are organized into "skill groups" with each group including all scheduled agents having a particular combination of skills. The method begins by generating a plurality of net staffing arrays, each net staff array associated with a given call type and defining, for each time interval to be scheduled, an estimate of a difference between a given staffing level and a staffing level needed to meet a current call handling requirement. In addition to the net staffing arrays, the method uses a plurality of skills group availability arrays, each skills group availability array associated with the given call type and defining, for each combination of skill group and time interval to be scheduled, an estimate of a percentage of scheduled agents from each skill group that are available to handle a call. According to the method, the plurality of arrays are used to generate a proposed schedule for each of the plurality of scheduled agents. Thereafter, a call handling simulation is then run against the proposed schedule using a plurality of ACD call distribution algorithms (one for each call type being scheduled). Based on the results of the call handling simulation, the net staffing arrays and the skills availability arrays are refined to more accurately define the net staffing and skills usage requirements. The process of generating a schedule and then testing that schedule through the simulator is then repeated until a given event occurs. The given event may be a determination that the schedule meets some given acceptance criteria, a passage of a predetermined period of time, a predetermined number of iterations of the process, or some combination thereof.

In a preferred embodiment, a proposed schedule is "optimized" when it provides an acceptable call handling performance level and an acceptable staffing level in the simulation. Once the proposed schedule is "optimized," it may be further adjusted (within a particular skill group) to accommodate agent preferences.

The foregoing has outlined some of the more pertinent objects and features of the present invention. These objects should be construed to be merely illustrative of some of the more prominent features and applications of the invention. Many other beneficial results can be attained by applying the disclosed invention in a different manner or modifying the invention as will be described. Accordingly, other objects and a fuller understanding of the invention may be had by referring to the following Detailed Description of the Preferred Embodiment.

BRIEF DESCRIPTION OF THE DRAWINGS

For a more complete understanding of the present invention and the advantages thereof, reference should be made to the following Detailed Description taken in connection with the accompanying drawings in which.

DETAILED DESCRIPTION OF THE PREFERRED EMBODIMENT

Familiarity with telephone call center operations is presumed. In such operations, it is desired to plan, schedule and manage workforce personnel in an environment in which there is a varying workload by time of day and by day of week to be staffed with a variable number of servers. In general, these servers or "agents" are required to respond to an event load that has been forecast to occur in the future. One such environment is a telephone call center in which, for example, an "event" is an incoming call to the center. It is known to provide so-called "workforce" management systems that generate forecasts of call volumes and call handling times based on historical data, and to determine how much staff will be needed at different times of the day and week. These known systems have the capability of creating schedules that match the staffing to the anticipated needs. A representative system is described in U.S. Pat. No. 5,325,292, which patent is assigned to the assignee of this application.

According to the present invention, each of a plurality of agents to be scheduled in the call center has a combination of defined "skills." One or more agents are then organized into "skill groups," each including all scheduled agents having a particular sub-combination of skills. Thus, for example, agents in skill group A have skills 1, 2 and 3, wherein agents in skill group B have skills 2, 3 and 5, for instance. Skills designations may be further qualified, for example, as "primary" or "secondary" skills, or with some other designation of skill priority or degree of skill attainment. In the preferred embodiment, skill priorities are included when organizing agents into skill groups; in a particular skill group, all agents have the same skills at the same priority levels. It is further assumed that calls arriving at the call center may be classified according to so-called "call types" based on a dialed number and (possibly) other information, such as the calling number or some caller response to network prompts. In the paradigm of the present invention, each agent has one or more identified skills that make the agent available to handle particular call types. The principal goal of the invention is to create a work schedule for that agent (and other agents scheduled to work at the same time during a given scheduling interval) that maximizes the quality of service offered by the call center while making efficient use of call center resources.

Figure 1:
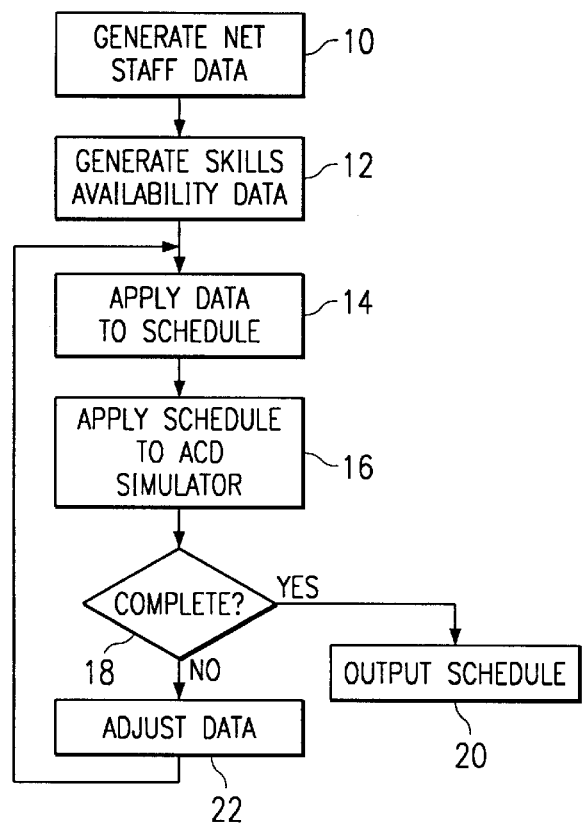
FIG. 1 is a flowchart of the preferred method of the invention for generating an optimum schedule for a plurality of scheduled agents in a telephone call center.

To this end, the present invention provides a method by which a series of call handling simulations are run to generate incremental or "interim" schedules that, through a feedback mechanism, progress toward some "optimum" scheduling solution for the call center. A preferred technique for accomplishing this result is now described. A flowchart describing the preferred technique is shown in FIG. 1. It should be appreciated that these method steps are preferably implemented in a computer. A representative computer is a personal computer or workstation platform that is Intel x86-, PowerPC®- or RISC®-based, and includes an operating system such as Windows '95, Windows® NT, IBM® OS/2®, IBM AIX®, Unix or the like. Such machines include a known display interface (a graphical user display interface or "GUI") and associated input devices (e.g., keyboard, mouse, etc.).

The method begins at step 10 to generate a "net staff" array for each call type. The net staff array is generally a one-dimensional array (for each call type) that contains "difference" values generated (at least initially) using call volume forecasts and Erlang processing, all in a known manner. The initial estimates for net staff values need not be extremely accurate, as they are refined in later iterations of the method as will be described. In particular, the net staff array provides, for each time interval to be scheduled, the number of agents (usually a fractional amount) still needed to cover the call type's forecast of calls for that interval. As scheduling proceeds, the net staff for a given interval may be fractional, or it may be negative if the interval is already over-staffed. Thus, the net staff array contains values representing the difference between a currently-scheduled staff and an amount of staff needed to handle the call type during the interval, in other words, a current estimate of the difference between the staffing level provided in the current schedule and the staffing level needed to meet current call handling requirements.

The method then continues at step 12 to generate a skills availability usage array for each call type. Although steps 10 and 12 are shown in the flowchart sequentially, this is not required. The two steps may be carried out at the same time, or in reverse sequence. The skills availability array (only one of which is shown) has two dimensions, namely, skill group and time interval. For each combination of skill group and time interval, the array provides a "current estimate" for the fraction of availability the call type should expect for scheduled agents. The initial estimates for values in this array need not be extremely accurate, as they are refined in later iterations of the method as will be described. Thus, for example, the initial estimate may be "0" for any skill group that is not eligible at all for a call type, and "½" otherwise. In an alternate embodiment, the initial estimates are derived from historical call center data; yet another alternative is to set these values by simple fixed formulas.

The method then continues at step 14 to apply the current net staff array(s) and skill group availability array(s) (one for each call type, respectively) to a scheduler. The scheduler can be an extension of a known schedule generation program, e.g., a program used for queue/team scheduling. A representative scheduler program is TotalView™, which is available from IEX Corporation, as modified to do multiple iterations as described below. This program takes the net staff array(s) and the skill group availability array(s) input thereto, processes that data, and generates a first iteration of a schedule. The schedule output from the scheduler preferably describes all staffing for a given period of time (typically one or two weeks). For every agent that will be assigned to work during the schedule period, there is a schedule entry for every day the agent will work. The schedule entry preferably indicates what time the agent will start work, when each break or lunch period is scheduled, how long each break or lunch is, and when the agent will finish work. The schedule may exist in several forms, although preferably the form used as input by the simulator portion (in the next step) is a simple ASCII text file.

Thereafter, the method continues at step 16 by applying the schedule to an ACD simulator module to run a call handling simulation. The simulator generally performs the following actions: (1) reads a schedule and creates simulated agents who will log in, log out, and go on breaks at the times indicated in the schedule (the simulator, of course, runs many times faster than realtime, so a particular simulation of a week's call center activity takes seconds or minutes depending on the size of the call center; (2) generates simulated calls that match the forecasted call volumes for the call types of interest; (3) delivers the simulated calls to the simulated agents using decision logic similar to what would be used by an actual ACD, and simulates the agents' handling of the calls using average handle time statistics provided from other portions of the workforce management system; (4) collects and reports statistics about the simulated call center including, for example, the Average Speed of Answer (ASA) for each call type, the number of simulated calls abandoned by the caller, and the like; (5) estimates the number of additional agents needed (or the number of surplus) for each call type at each simulated schedule interval (a "schedule interval" is, for example, "5" or "15" minutes) so that the simulated answer speed would meet the customer's target; and (6) keeps track of how much simulated time each simulated agent spent on each call type, and how much time each agent was idle. Thus, the call handling simulation in step 16 decides what to do when each simulated call arrives, and when each simulated agent becomes free to handle another call. The specific call handling simulation may be suitably controlled by a call distribution algorithm that may vary depending on the type of ACD being simulated and/or whether or not the ACD supports multiple skills-based priority levels.

Once the schedule is processed in this way, a simulation "pass" is complete. A test is then done at step 18 to determine whether the process is "complete." If the outcome of the test is positive, the method branches to step 20 and outputs a schedule. If, however, the outcome of the test at step 18 is negative, the method "adjusts" the net staffing and availability usage arrays at step 22 (as will be described below) and then returns to step 14 to generate a revised schedule, which is then applied to the simulator in a next "pass" or iteration. The outcome of the test at step 18 may depend on one or more factors, and several alternative approaches may then be used to determine when to stop the process. In a preferred embodiment, the method involves successively iterating and refining schedules multiple times. The results of each iteration may be presented to the user, who would then decide whether to stop or to do another iteration. Thus, a positive outcome of the test at step 18 may occur, in effect, "manually" when the user determines that the process is complete. Alternatively, the method may be run for a fixed number of passes through the simulator, at which point a positive outcome of the test at step would occur. Yet another alternative, is to run the method for a fixed amount of time, with the results of the last pass before time expired being used. In a preferred embodiment, specific schedule quality criteria are defined, with the method being run until those criteria are satisfied (indicating a positive outcome to the test at step 18). The method is compatible with any of these options, or with combinations of them. The choice of termination criteria can be different for each user, and a particular criteria is not essential to the invention.

If the outcome of the test at step 18 is negative, however, a new "pass" or iteration will be run. According to an advantageous feature of the invention, information generated during a previous simulation (and output by the simulator) is then used to adjust the net staffing and skill availability array(s) for the next scheduler pass. This "feedback" technique is designed to drive the method toward an "optimum" schedule, which typically occurs after a plurality of iterations. This operation will be illustrated below. In a preferred embodiment, the information used to adjust the arrays may be as follows. As noted above, the simulator estimates the number of additional agents needed (or the number of surplus) for each call type at each simulated schedule interval so that the simulated speed of answer would meet the customer's target for that interval. This information is thus substituted in the "net staffing" array used to for the next scheduler run. Likewise, as noted above, the simulator keeps track of how much simulated time each simulated agent spent on each call type, and how much time each agent was idle. This information (in addition to the list of skills possessed by each simulated agent) is then used to create the "skills" usage data that comprises the skills availability array for the next scheduler pass. Thus, the step of adjusting the arrays (step 22 in FIG. 1) preferably involves creating new array(s) in which the new net staffing and skill group usage data is substituted for the data in the prior pass.

More specifically, the net and skill group availability arrays are refined as follows. For every simulated 15-minute (or other) interval, the simulator keeps track of how many calls of each type arrived, and how many were answered. It also keeps track of how much idle time each agent has. The first order approximation to the net staff is the difference between calls offered and calls answered, times the average handle time for the call type, divided by the number of seconds in the schedule interval. That first-order approximation is reduced by an amount calculated from the percentage of idle agent time, so that if all the simulated calls are being handled (and there is a lot of idle time), the net staffing for that interval is negative. With respect to skill group availability, the operation is preferably as follows. The simulator, at each simulated second, in effect looks at each simulated agent and increments a counter for the call type the agent is handling and the agent's skill group. Those counters, when divided by the number agents in the skill group and the number of seconds in the simulation, give a first order approximation of skill group availability data values. In the preferred embodiment, these skills usage fractions are increased by proportionally allocating the percentage of agent idle time to the call types served during the agents' non-idle time.

Figure 2:
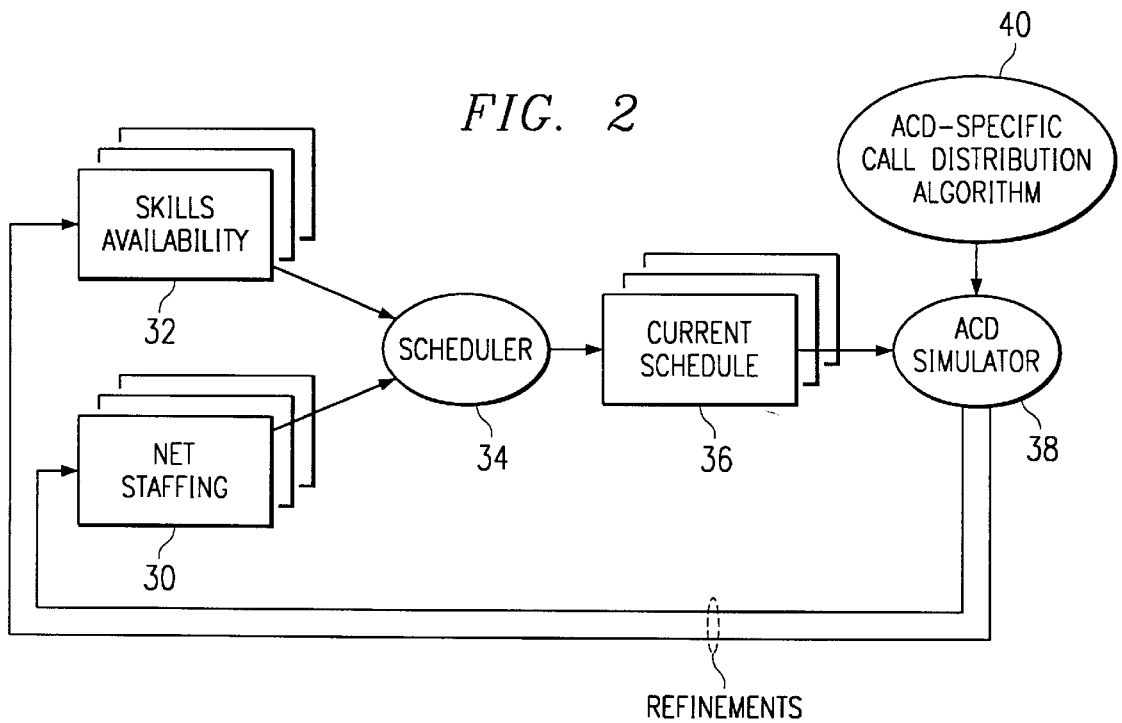
FIG. 2 is a block diagram of the skills-based system modeling infrastructure of the present invention.

FIG. 2 illustrates a block diagram of the feedback mechanism. The net staffing array(s) 30 and skills availability array(s) 32 (in both cases, one for each call type) are supplied to the scheduler 34, which outputs a "current" schedule 36. This current schedule is then applied to an ACD simulator 38, which is controlled by a call distribution algorithm 40. Using call volume and average handle time forecasts for each call type and the current agent work schedule 36, the ACD simulator simulates call arrivals, call distribution and call handling for each call type over the schedule's time range. As noted above, the simulation preferably makes use of skills-based call routing decisions that may be specific to a particular brand of ACD or to a particular customer's programming of its ACD. If desired, the ACD simulation may be run multiple times with the results then averaged. If the process is not complete, information generated by the simulation is used to refine the net staffing array(s) 30 and the skills availability array(s) 32 between each successive iteration. Each iteration preferably involves a call handling simulation run by the ACD simulator module.

When the "current" schedule provides acceptable call handling performance and acceptable staffing levels, or if some other "termination" criteria is met, the schedule is said to be "optimized" and the routine ends. If desired, individual scheduled agents may then "trade" work and break times to better match preferences (all in a known manner). If this further refinement is desired (and it is optional), the optimized schedule may be further processed, provided the trading is done taking account of skills usage data to maintain schedule integrity.

The general flow of processing described above applies to all users of the method, as would the existence and use of the net staff and skills usage arrays for each call type. As noted above, the schedule generation program may be different for each user without affecting the overall method. The only requirement is that the scheduling program make appropriate use of the net staff and skill group availability data in evaluating its schedule options. Moreover, the call handling simulation needs to decide what to do when each simulated call arrives, and when each simulated agent becomes free to handle another call. The decision algorithms may be different from one user to another, because they need to simulate the skills-based routing algorithms that will be employed by the user's particular ACD systems. Methods for simulating such routing algorithms and for "plugging in" specific decision modules are straightforward and are outside the scope of the invention being described here.

In particular, ACDs vary in the number and complexity of skills definitions they support for skills-based routing. For example, some support multiple priority levels for skills, some have no priority notion, and some support "primary" and "secondary" skills. In some cases, multi-skilled agents are represented explicitly as having each of the individual skills; in other ACDs each agent has only one skill, so a new skill must be defined for each combination of other skills that an agent might possess. Much of this per-ACD variation can be handled in the ACD-specific routing simulator modules. The method requires only that the skill group divisions in the agent population be understood and available to the method. Means for mapping a specific ACD's skills representation to a suitable internal representation for the method are straightforward and are outside the scope of the invention being described.

Figure 3:
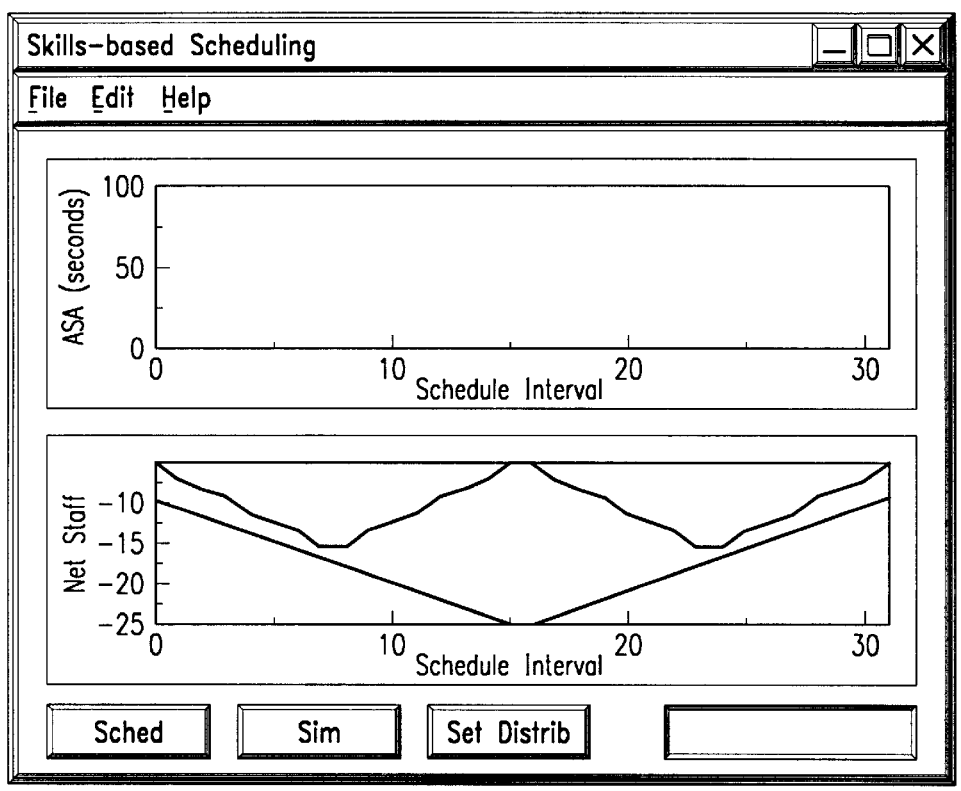
FIG. 3 illustrates a display interface including a pair of graphs generated during an initialization phase of the method, the upper graph illustrating an Average Speed of Answer (ASA) of a given call per schedule interval, and the lower graph illustrating a net staff per call type per scheduling interval in an exemplary embodiment.

A series of iterative schedule/simulation "runs" is now illustrated to show how the inventive feedback technique drives the method toward a high quality schedule. Each of the figures described below includes two separate graphs, an upper graph illustrating an Average Speed of Answer (ASA) of a given call per schedule interval, and the lower graph illustrating a net staff per call type per scheduling interval. FIG. 3 shows these graphs upon initialization (i.e. before a first pass) with call volume forecast data for three Call Types over an 8-hour (15-minute schedule periods) day. The ASA graph is blank because the ACD simulation has yet to run.

In this illustrative scenario, Call Type 1 has a steady volume of calls all day long, Call Type 2 has a mid-morning peak and a mid-afternoon peak, and Call Type 3 has a single mid-day peak. From the call volume data, the routine calculates an initial estimate of staffing needed for each Call Type, which is shown on the lower graph as negative "net staff" values for each interval. The initial staff calculation is done using standard techniques with each Call Type considered separately. In other words, any large-team efficiencies possibly gained by using skills routing to share agents among the Call Types can be ignored for the initial estimate, since the net staff will be refined as the process iterates. Also, initial estimates have been created for what fraction of time agents from each skill group will spend on handling each of the Call Types during each schedule interval. These estimates are the "skills usage" data (i.e., the skills availability array(s)) as previously described. As previously noted, the initial skills usage estimates can be crude because they also will be refined as the process iterates.

Figure 4A:
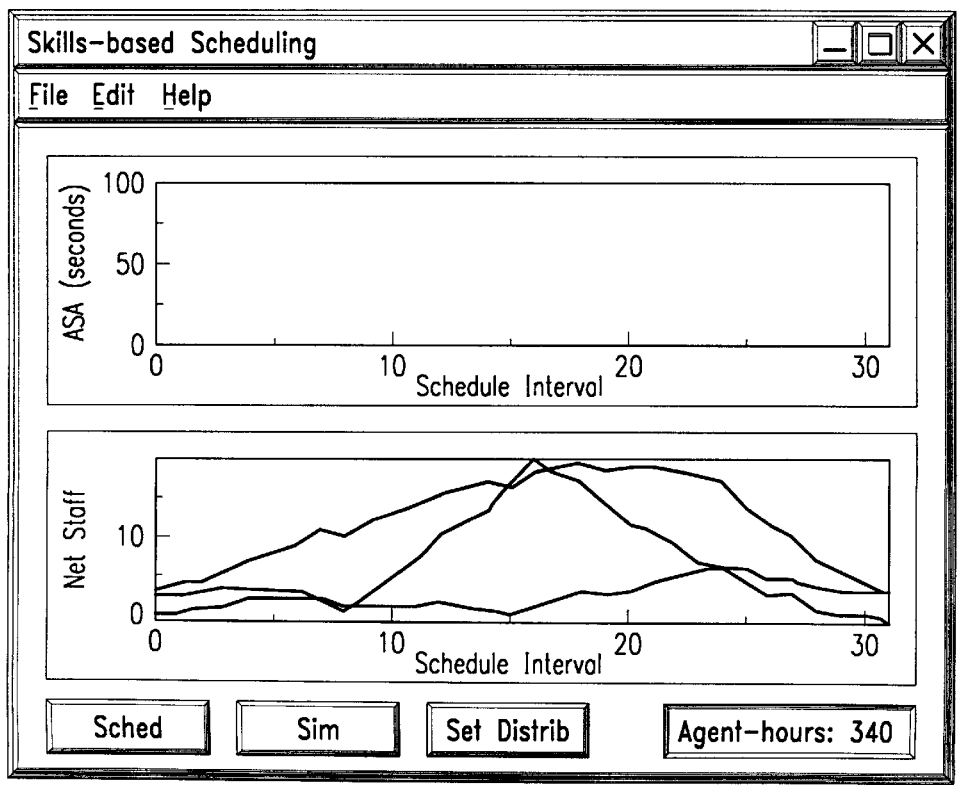
FIG. 4A illustrates the net staff graph of FIG. 3 after a first iteration through the scheduler.
Figure 4B:
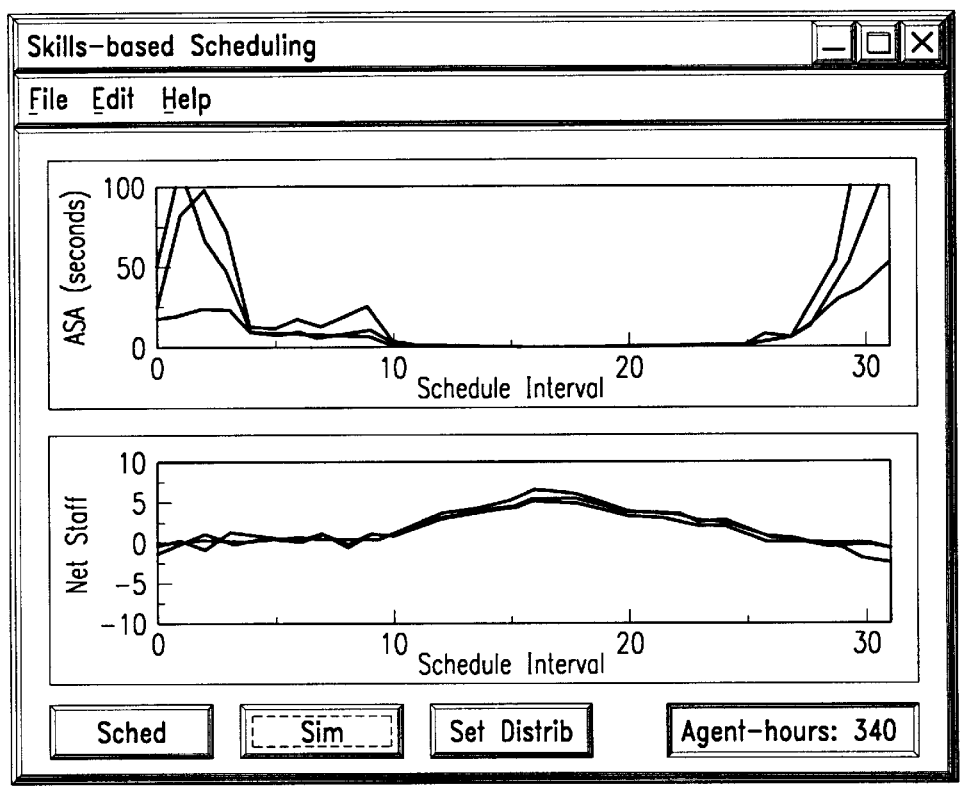
FIG. 4B illustrates the ASA graph and the net staff graph after the output of the scheduler is applied through the ACD simulator in the first iteration.

FIG. 4A illustrates the graph of net staff versus schedule interval after making a first pass through the scheduler. This is the first pass at creating an agent schedule, using the initial net staff and skills usage estimates. In this example, to get Call Type 3 adequately staffed, the scheduler had to greatly over-staff Call Types 1 and 2. This is because the initial skills usage estimates were unrealistically high. FIG. 4B illustrates the output of the first pass through the simulator. As noted above, the simulator simulates the handling of the predicted call volume by the agents in the first schedule attempt. The results are (as expected) not acceptable. Long call delays build up at the beginning and end of the day (as seen in the Average Speed of Answer graph), and in the middle of the day all the Call Types are significantly over-staffed (as seen in the net staff graph). This output, however, provides a first refinement of the net staff data and a more realistic view of skills usage data. Both the net staff and skills usage data the serve as input for a second scheduling pass, as previously described.

Figure 5A:
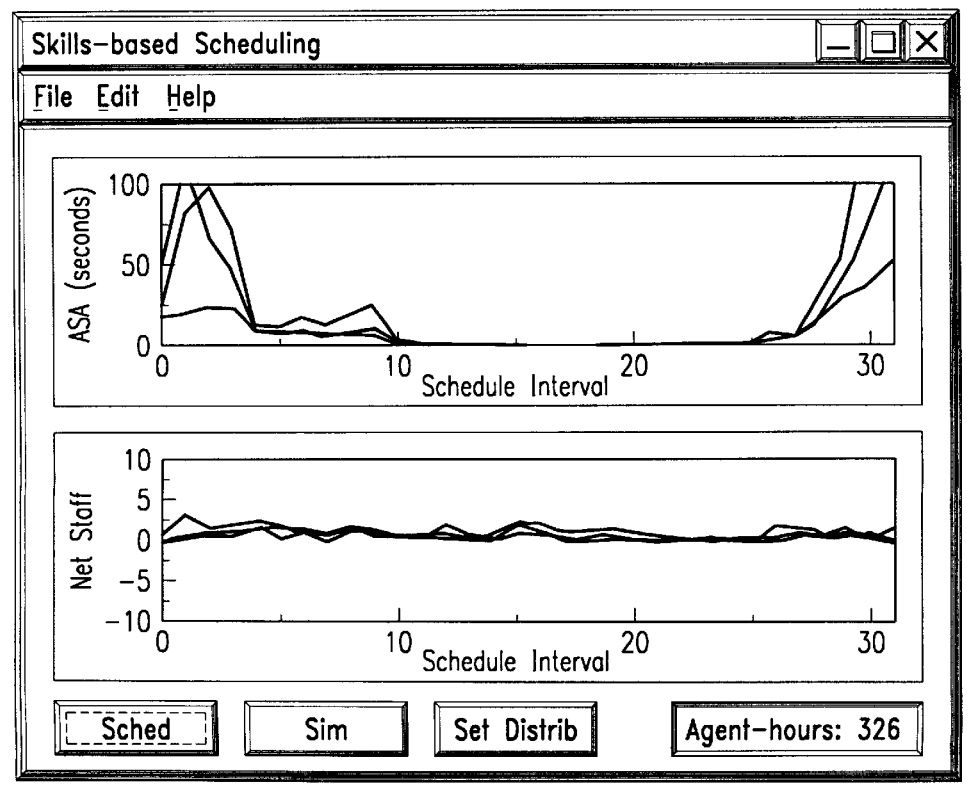
FIG. 5A illustrates the ASA graph and the net staff graph after a second iteration through the scheduler.

FIG. 5A shows the second schedule run. The ASA graph in FIG. 5A is the same as that shown in FIG. 4B. With the more realistic net staff and skills usage data to work with, the perceived over-staffing and under-staffing is smoothed out, and agent-hours have been cut from the original schedule.

Figure 5B:
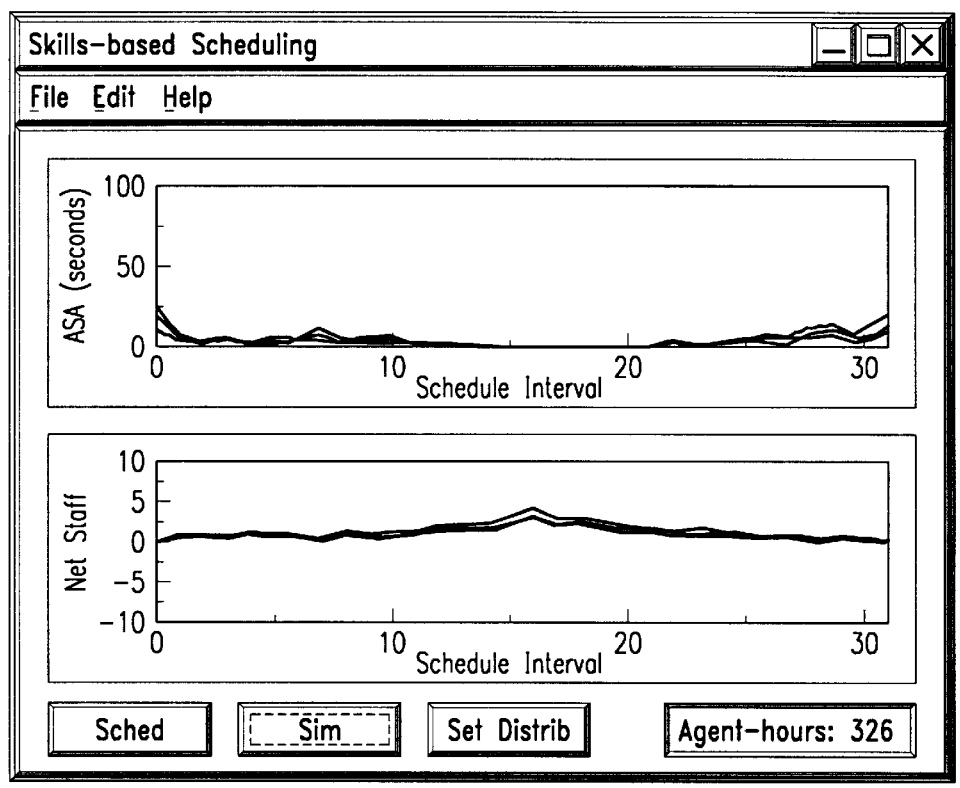
FIG. 5B illustrates the ASA graph and the net staff graph after the output of the scheduler is applied through the ACD simulator during the second iteration.

FIG. 5B illustrates the results of the second pass through the simulator. The results are much better than the results of the first simulation run, although the simulated call center is still somewhat over-staffed in total. The results of this simulation provides input to another round of refinement on the net staff and skills usage estimates, and then a third schedule run is made.

Figure 6A:
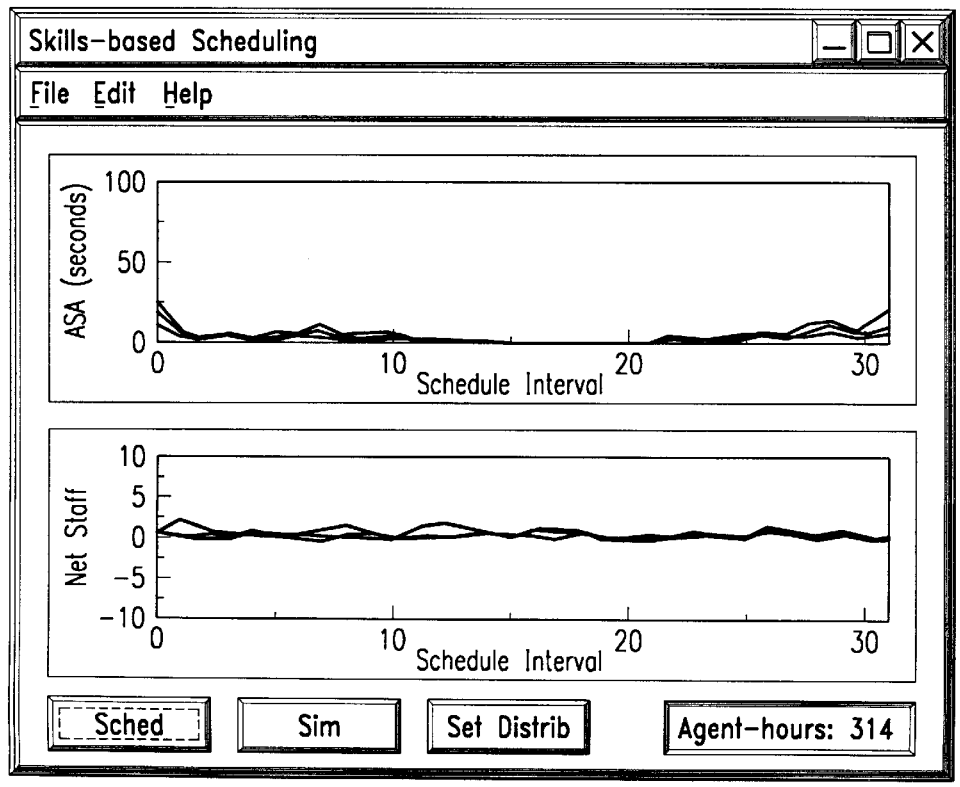
FIG. 6A illustrates the ASA graph and the net staff graph after a third iteration through the scheduler.
Figure 6B:
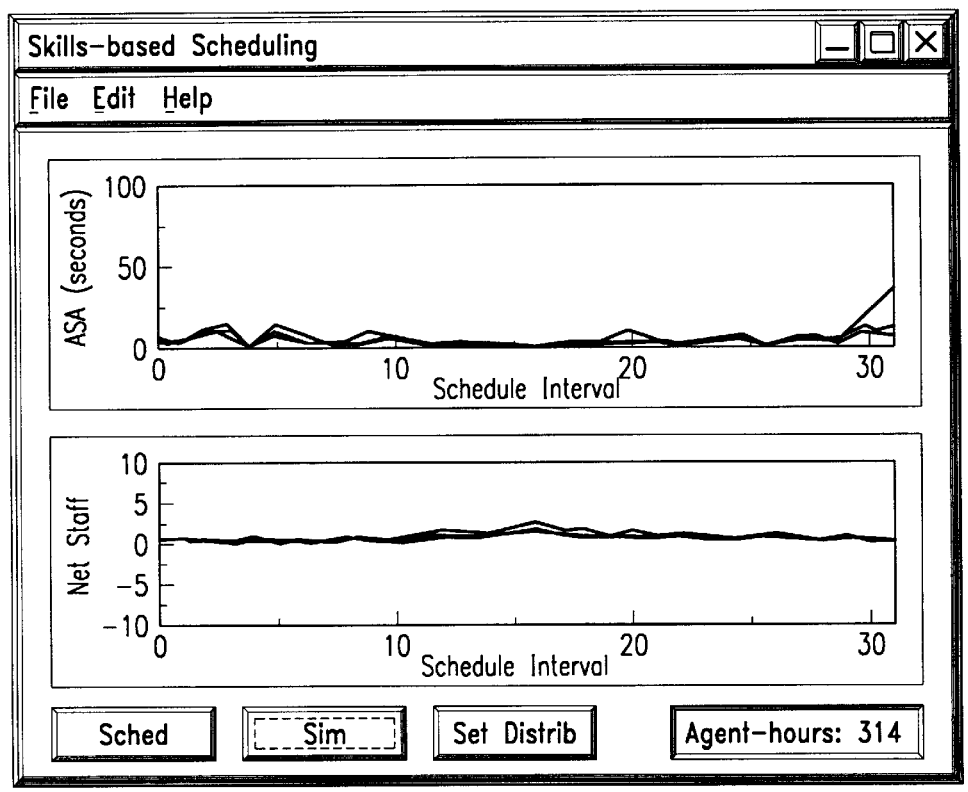
FIG. 6B illustrates the ASA graph and the net staff graph after the output of the scheduler is applied through the ACD simulator during the third iteration.

FIG. 6A shows the third schedule run. Again, the ASA graph of FIG. 6A is the same as that shown in FIG. 5B. The third schedule pass again smoothes out the perceived under-staffing and over-staffing, and trims a few more hours from the total schedule. FIG. 6B shows the results of the third simulator pass. The outputs are moving toward acceptable levels. In particular, the speed of answer performance is generally in the desired range, and the mid-day over-staffing is not too great. This schedule may be acceptable, however, in this scenario, one more pass is made. Once again, another round of refinement is first made on the net staff and skills usage data for the scheduler to work with.

Figure 7A:
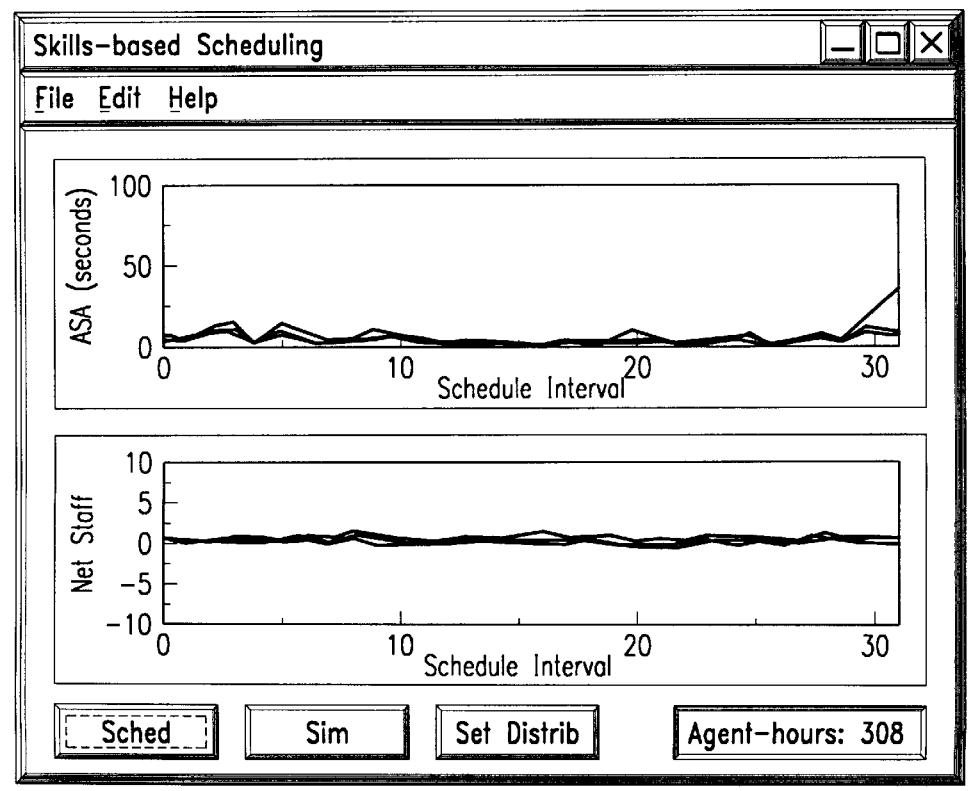
FIG. 7A illustrates the ASA graph and the net staff graph after a fourth iteration through the scheduler.
Figure 7B:
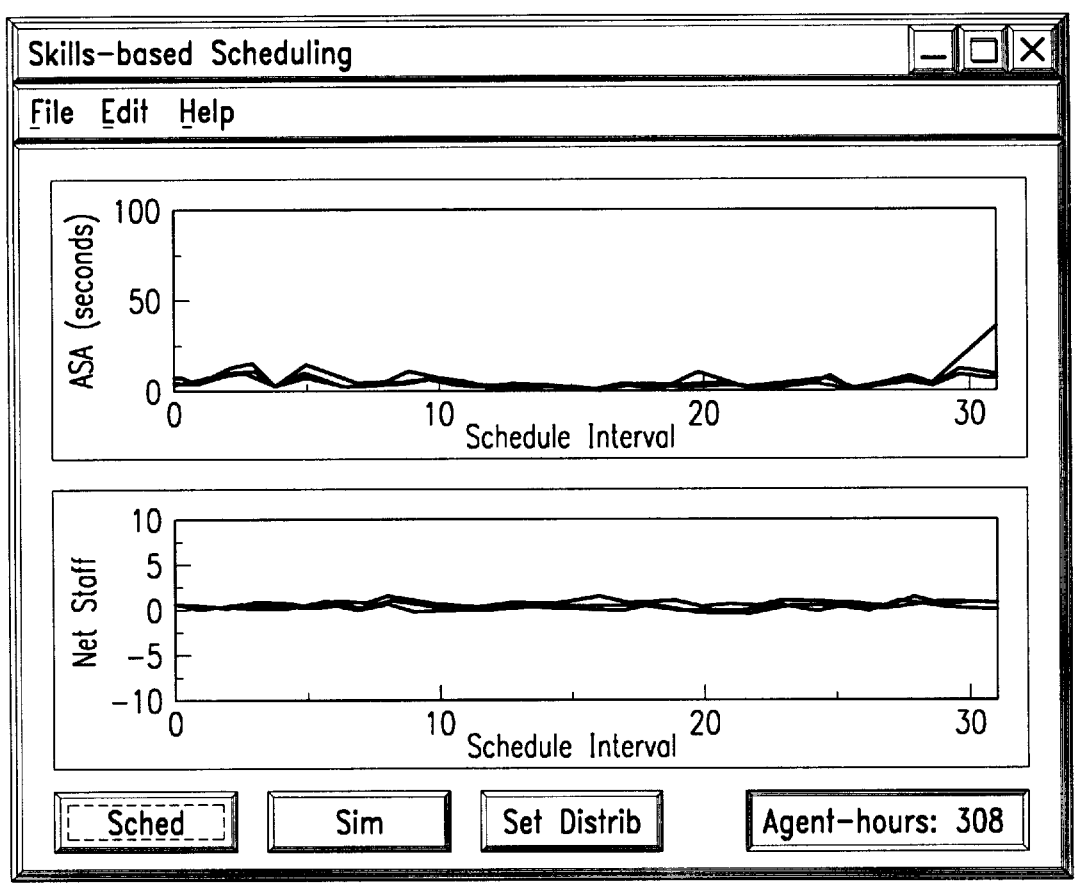
FIG. 7B illustrates these graphs after the output of the scheduler is applied through the ACD simulator during the fourth iteration.

FIG. 7A shows the fourth and (in this case) final schedule run. The ASA graph of FIG. 7A is the same as that shown in FIG. 6B. This final run trims a bit more from the total scheduled agent-hours, and it has redistributed agents slightly to reduce the mid-day over-staffing. FIG. 7B shows the output of the fourth simulation run. The change from the previous schedule and simulation is subtle, but positive. At this point, the iterative process is considered complete (given the probability of diminishing returns in future passes), and the last schedule is then used for actual call center scheduling.

The above techniques are exemplary, and one of ordinary skill in the art will appreciate that many variations are possible. Thus, for example, while the net staffing array(s) are described as individual one-dimensional arrays (one per call type), it is envisioned that these array(s) may be processed as a two-dimensional table (call types by time intervals). Likewise, while the skills availability array(s) are described as individual two-dimensional arrays (one per call type), these array(s) may be processed as a three-dimensional structure (call types by skill type by time interval). Moreover, all such information may be combined in a multi-dimensional data structure such that the net staff and skills usage data is all processed, in effect, simultaneously. Thus, the individual method steps (e.g., steps 10 and 12 in FIG. 1) should be broadly construed to cover distinct and/or interdependent processing of such data, whether the data is maintained in individual data arrays or multi-dimensional data structures.

As noted above, each of the components of the skills-based scheduling method and system is preferably software, and thus one of the preferred implementations of the invention is as a set of instructions (program code) in a code module resident in the random access memory of the computer. Until required by the computer, the set of instructions may be stored in another computer memory, for example, in a hard disk drive, or in a removable memory such as an optical disk (for eventual use in a CD ROM) or floppy disk (for eventual use in a floppy disk drive), or downloaded via the Internet or other computer network. In addition, although the various methods described are conveniently implemented in a general purpose computer selectively activated or reconfigured by software, one of ordinary skill in the art would also recognize that such methods may be carried out in hardware, in firmware, or in more specialized apparatus constructed to perform the required method steps.

Use of the present invention provides numerous advantages. In accordance with the present invention, ACD call distribution algorithms are used in evaluating candidate schedules. The reverse is also possible. In particular, by taking a given schedule and running the schedule through the simulation portion (while varying the ACD call distribution algorithms), a "what if" tool is created to evaluate possible changes in the ACD programming. The two uses can then iterate and be used interchangeably. One could generate a schedule as described above, then use the simulator to play with the ACD call distribution, then generate a new schedule tuned to the new distribution algorithm, etc.

Having thus described our invention, what we claim as new and desire to secure by Letters Patent is set forth in the following claims:

What is claimed is:

1. A method, using a computer, of determining an efficient schedule for a plurality of scheduled agents in a telephone call center, each of the plurality of scheduled agents having a combination of defined skills and wherein the plurality of scheduled agents may be organized into skill groups each including all scheduled agents having a particular combination of skills, comprising the steps of:
   (a) generating net staffing data per call type defining, for each time interval to be scheduled, an estimate of a difference between a given staffing level and a staffing level needed to meet a current call handling requirement;
   (b) generating skills group availability data per call type defining, for each combination of skill group and time interval to be scheduled, an estimate of a percentage of scheduled agents from each skill group that are available to handle a call;
   (c) using the net staffing data and the skills group availability data to generate a schedule for each of the plurality of scheduled agents;
   (d) running a call handling simulation against the schedule;
   (e) adjusting the net staffing data and the skills availability data as a result of the call handling simulation, and
   (f) repeating steps (c)–(e) until an output schedule occurs.

2. The method as described in claim 1 wherein the output schedule is generated when the schedule meets some given acceptance criteria.

3. The method as described in claim 2 wherein the given acceptance criteria include an acceptable call handling performance level and an acceptable staffing level.

4. The method as described in claim 1 wherein the output schedule is generated after a passage of a predetermined period of time.

5. The method as described in claim 1 wherein the output schedule is generated after a predetermined number of iterations of steps (c)–(e).

6. The method as described in claim 1 further including the step of:
   (g) adjusting the schedule to accommodate agent preferences.

7. The method as described in claim 6 wherein the adjusting step is performed within a skill group.

8. The method as described in claim 6 wherein the adjusting step is performed across skill group boundaries whenever predefined schedule quality criteria are not compromised by such adjustments.

9. The method as described in claim 1 wherein the step of adjusting the net staffing data includes generating, for each time interval, a new estimate of the difference between a given staffing level and a staffing level needed to meet a current call handling requirement.

10. The method as described in claim 1 wherein the step of adjusting the skills availability data includes generating, for each combination of skill group and time interval to be scheduled, a new estimate of a percentage of scheduled agents from each skill group that are available to handle a call.

11. The method as described in claim 1 wherein the call handling simulation in step (d) comprises a set of one or more passes through an automatic call distributor (ACD) simulator.

12. The method as described in claim 11 wherein a plurality of passes through the ACD simulator are averaged.

13. The method as described in claim 1 wherein step (c) is performed by a scheduler.

14. A method, using a computer, of determining an efficient schedule for a plurality of scheduled agents in a telephone call center, each of the plurality of scheduled agents having a combination of defined skills and wherein the plurality of scheduled agents may be organized into skill groups each including all scheduled agents having a particular combination of skills, comprising the steps of:
   (a) generating a plurality of net staffing arrays, each net staff array associated with a given call type and defining, for each time interval to be scheduled, an estimate of a difference between a given staffing level and a staffing level needed to meet a current call handling requirement;
   (b) generating a plurality of skills group availability arrays, each skills group availability array associated with the given call type and defining, for each combination of skill group and time interval to be scheduled, an estimate of a percentage of scheduled agents from each skill group that are available to handle a call;
   (c) using the plurality of arrays generated in steps (a)–(b) to generate a schedule for each of the plurality of scheduled agents;
   (d) running a call handling simulation against the schedule generated in step (c) using an ACD call distribution algorithm selected from a group of ACD call distribution algorithms;
   (e) refining the net staffing arrays and the skills availability arrays as a result of the call handling simulation, and
   (f) repeating steps (c)–(e) until a given event occurs, the given event selected from the group of events consisting of a determination that the schedule meets some given acceptance criteria, a passage of a predetermined period of time, predetermined number of iterations of steps (c)–(e), and a combination thereof.

15. The method as described in claim 14 further including the step of
   (g) adjusting the schedule to accommodate agent preferences.

16. The method as described in claim 15 wherein the adjusting step is performed within a skill group.

17. The method as described in claim 14 wherein the step of refining the net staffing arrays includes, for each said array, generating, for each time interval, a new estimate of the difference between a given staffing level and a staffing level needed to meet a current call handling requirement.

18. The method as described in claim 14 wherein the step of refining the skills availability arrays includes, for each said array, generating, for each combination of skill group and time interval to be scheduled, a new estimate of a percentage of scheduled agents from each skill group that are available to handle a call.

19. A computer program product in a computer-readable medium for use in a computer for determining an efficient schedule for a plurality of scheduled agents in a telephone call center, each of the plurality of scheduled agents having a combination of defined skills and wherein the plurality of scheduled agents may be organized into skill groups each including all scheduled agents having a particular combination of skills, the computer program product comprising:

first means for generating net staffing data per call type defining, for each time interval to be scheduled, an estimate of a difference between a given staffing level and a staffing level needed to meet a current call handling requirement;

second means for generating skills group availability data per call type defining, for each combination of skill group and time interval to be scheduled, an estimate of a percentage of scheduled agents from each skill group that are available to handle a call;

third means responsive to the first and second means for generating a schedule for each of the plurality of scheduled agents;

fourth means for running a call handling simulation against the schedule; and fifth means responsive to the fourth means for refining the net staffing array and the skills availability data as a result of the call handling simulation for a subsequent iteration.

20. A computer program product in a computer-readable medium for use in a computer for determining an efficient schedule for a plurality of scheduled agents in a telephone call center, each of the plurality of scheduled agents having a combination of defined skills and wherein the plurality of scheduled agents may be organized into skill groups each including all scheduled agents having a particular combination of skills, the computer program product comprising:

means for generating a data structure comprising (a) a net staffing array per call type defining, for each time interval to be scheduled, an estimate of a difference between a given staffing level and a staffing level needed to meet a current call handling requirement, and (b) a skills group availability array per call type defining, for each combination of skill group and time interval to be scheduled, an estimate of a percentage of scheduled agents from each skill group that are available to handle a call;

means responsive to the generating means for creating a schedule for each of the plurality of scheduled agents;

means responsive to the schedule creating means for simulating an operation of the telephone call center using the schedule; and means responsive to the simulating means for refining each net staffing array and each skills availability array as a result of the telephone call center simulation for a subsequent iteration.

\* \* \* \* \*